April 27, 1943.　　　G. L. USSELMAN　　　2,317,503

TRANSMISSION LINE

Filed Aug. 16, 1939　　　2 Sheets-Sheet 1

INVENTOR.
GEORGE L. USSELMAN
BY
ATTORNEY.

April 27, 1943.　　G. L. USSELMAN　　2,317,503
TRANSMISSION LINE
Filed Aug. 16, 1939　　2 Sheets-Sheet 2

INVENTOR.
GEORGE L. USSELMAN
BY
ATTORNEY.

Patented Apr. 27, 1943

2,317,503

UNITED STATES PATENT OFFICE 2,317,503

TRANSMISSION LINE

George Lindley Usselman, Rocky Point, N. Y., assignor to Radio Corporation of America, a corporation of Delaware Application August 16, 1939, Serial No. 290,417

6 Claims. (Cl. 178—44)

The present invention relates to transmission lines and, more particularly, to a means for transmitting ultra high frequency energy from a source such as an oscillation generator to a desired utilization device.

An object of the present invention is the provision of a transmission line which will efficiently transmit high frequency energy from a source to a desired utilization device.

Another object of the present invention is to transmit ultra high frequency energy from a source to a utilization device without excessive losses.

Still another object of the present invention is to provide a transmission line for ultra high frequency energy which does not radiate.

The foregoing objects, and others which may become apparent from the following detailed description, are attained by providing a transmission line in the form of an elongated outer electrical conducting member forming a closed channel for the transmission of electro-magnetic flux. The capacity between a pair of adajacent edges running the entire length of the conducting member is so adjusted with respect to the inductance of the current paths in planes perpendicular to the axis of said member that said paths are each resonant to the operating frequency and a maximum circulating current flows in each of the paths. In this condition a maximum magnetic flux along the axis of the member then obtains. All of the transverse current paths along the length of the member are thus substantially completely coupled together and maximum energy is transmitted from one end of the transmission line to the other. The transmission line in effect constitutes a long tuned circuit extending from the source to the utilization device. By providing a plurality of different length current paths in each transverse plane a multiple tuned or band-pass transmission line may be obtained if desired.

Figure 1:
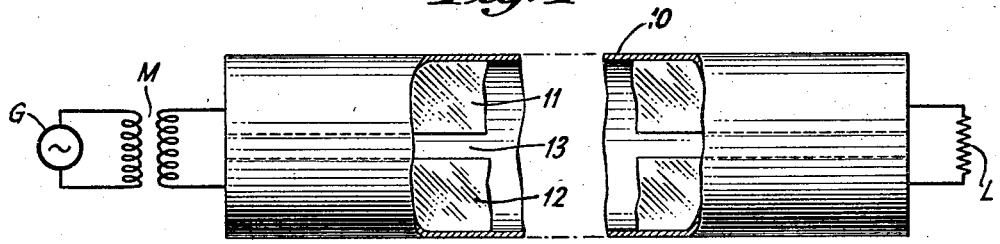
Figure 2:
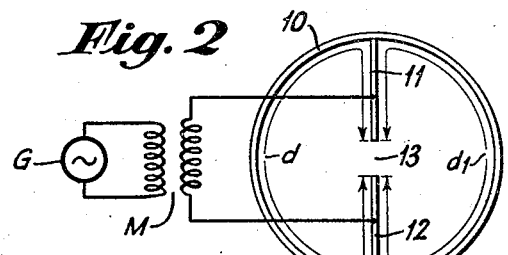
Figure 3:
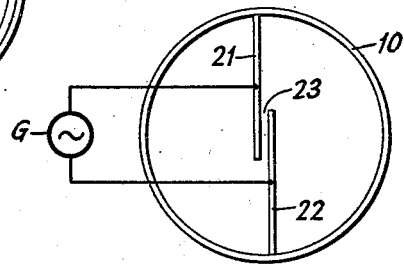
Figure 4:
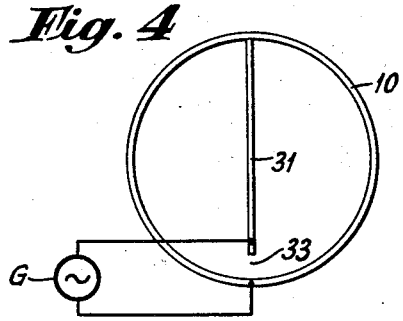
Figure 5:
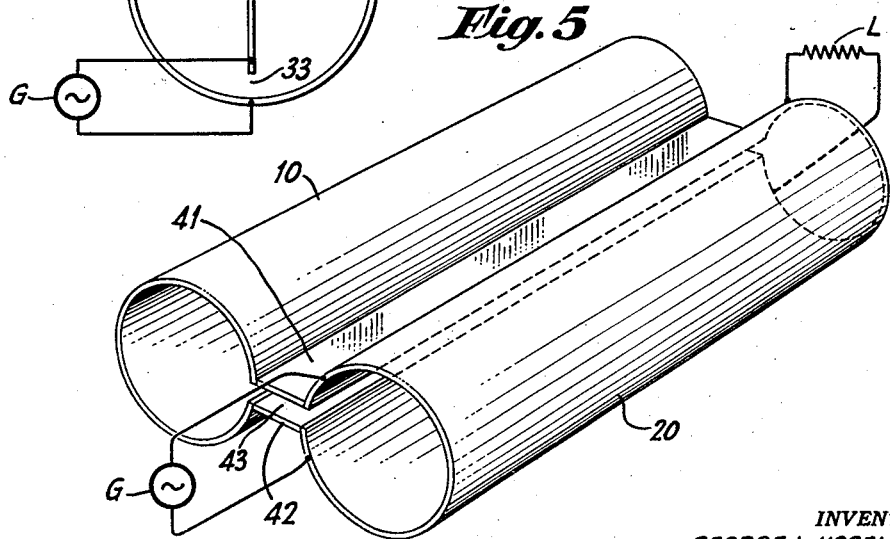
Figure 6:
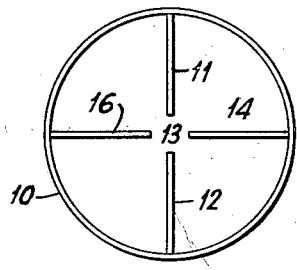
Figure 7:
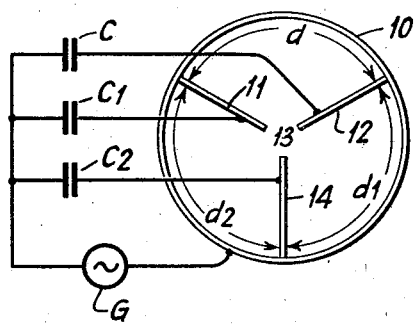
Figure 8:
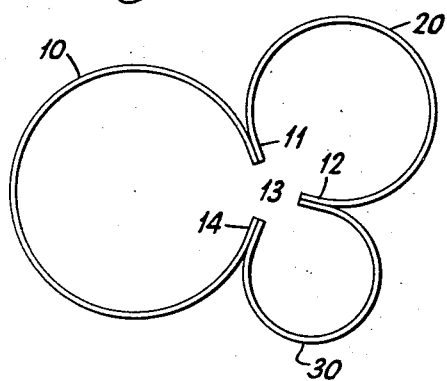
Figure 9:
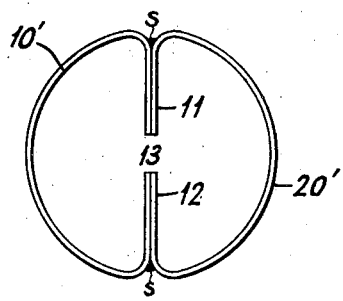

Reference will now be had, for a more complete understanding of the invention, to the following detailed description which is accompanied by drawings in which Figure 1 shows a side view of one embodiment of the present invention with a portion broken away and Figure 2 shows an end view; Figures 3 and 4 show end views of modifications of the invention; Figure 5 shows in perspective a further modification of the invention; Figures 6, 7 and 8 show still further modifications of the invention and Figure 9 shows one manner of constructing a transmission line similar to that shown in Figures 1 and 2.

In Figures 1 and 2 there is shown an outer tubular conductor 10. Inside the tubular conductor and on a diameter thereof are located the strips or fins 11 and 12. These are connected to the interior of the tube along their entire length by welding, brazing or soldering, leaving a uniform gap 13 at the center. The source of electrical oscillatory energy G is connected to fins 11 and 12 through a coupling transformer M at one end of the transmission line and the load L is connected to the fins at the other end of the transmission line. When oscillating electrical potentials are applied to strips 11 and 12 an oscillating current is set up in each half of the tube 10 and on the fins 11 and 12. This current flows parallel to a plane perpendicular to the tube axis, that is, in a plane parallel to the plane of the paper in Figure 2. The magnetic flux is parallel to the tube axis or perpendicular to the plane of the paper in Figure 2. The gap 13 constitutes a capacity and each half of the tube with part of each strip or fin 11 and 12 forms an inductance, said capacity and inductance being in series in the current path. Each half of the tube is substantially identical. At a certain frequency the capacitive reactance of the gap 13 and the inductive reactance of the current path, represented by lines $d$ and $d_1$, cancel or tune out and there is a maximum circulating current in the two circuits. This is the condition where maximum magnetic flux obtains and therefore is the best condition for transmitting energy along the line from one end to the other since this flux couples all of the imaginary transverse line segments together. In other words, each half of the line may be considered either one long tuned circuit or an infinite number of tuned circuits each comprising an elemental length of the transmission line and coupled together. The dimensions of the tube and fins are so adjusted that the maximum circulating current obtains at the desired operating frequency for the transmission line. This type of transmission line is quite selective and operates best at the frequency for which it is designed.

However, if desired, the transmission line may be made to respond at two different but adjacent frequencies by placing strips 11 and 12 to one side of the diameter so that the two current paths $d$ and $d_1$ are different lengths. A band-pass filter effect is thus obtained.

Figure 3 illustrates a modification of the transmission line, according to my invention, in which strips 21 and 23 are longer than the radius of the outer tube 10 and overlap at the center. The overlapping portion is so adjusted as to provide a uniform gap 23 along the entire length of the transmission line. The source of electrical oscillating energy G may be conductively connected to strips 21 and 22 as shown in Figure 3, or inductively coupled thereto through a transformer M as shown in Figure 1.

Still a further modification of the present invention is shown in Figure 4. This form is somewhat analogous to a single conductor line. The line consists of an outer tubular conductor 10 and a single strip or fin 31 located on the diameter of the tube with one edge of the strip soldered to the tube. The gap 33 between one edge of the fin 31 and the adjacent inside wall of tube 10 constitutes the capacity for the transverse tuned circuits, as previously described. Also, as previously described, the fin 31 may be placed to one side or the other of the diameter of the tube in order to provide different current path lengths whereby a band-pass effect is obtained.

In Figure 5 I have shown another modification of the invention which consists of two tubular conductors 10 and 20, split lengthwise along one side and the edges of the split joined together by two flat parallel strips 41 and 42, thus forming a transmission line which is in cross-section somewhat the shape of an hour glass. In this modification 41 and 42 constitutes the capacity element and the interior surfaces of tubes 10 and 20 form the inductances. The source of oscillating energy may be coupled at any symmetrical points above and below the center line and the load may be coupled to the other end of the transmission line in the same manner. If this modification is to be used as a filter one of the tubes 10 and 20 may be made larger than the other to provide a system having a maximum response at two frequencies. If these two frequencies are close together a band-pass characteristic may be provided, the width of the band depending upon the difference between the two response peaks.

In Figures 6, 7 and 8 I have shown in end view modifications of my invention employing three and four transverse tuned circuits. The modification of Figure 6 has four inner fins or ribs 11, 12, 14 and 16 radially arranged with respect to the outer shell 10. If all of the quadrants are the same size the line will respond best to a single frequency but if multiple response is desired the quadrants may be unequal. In Figure 7 the interior of the line is divided into three segments. As before, distances $d$, $d_1$ and $d_2$ may be equal or they may be different lengths. This figure also shows one way of finding a multiple line. The source $G_1$ is connected at one side to the shell and at the other side through condensers C, $C_1$ and $C_2$ to the fins 12, 11 and 14, respectively. The generator G may generate a single frequency or several discrete frequencies may be generated or it may cover a wide band such as employed in television.

Figure 8 is generally similar to Figure 5, except that three slotted tubes are used to obtain a triple response. The edges of the tubes 10, 20 and 30 are joined in any suitable manner, such as soldering, brazing or welding, without the interposition of the capacity strips used in Figure 5, though they may be used if desired.

Figure 9 illustrates one way in which the transmission line of Figures 1 and 2 may be constructed. A pair of substantially D-shaped tubes 10' and 20' having a central slot along the straight side of the D may be soldered or welded together back to back. The solder is indicated by the character S and should extend in to the inner edges of fins 11 and 12. A similar form of construction may be employed for the modifications of Figures 3, 4, 6 and 7.

While I have shown and particularly described several embodiments of my invention, it is to be distinctly understood that my invention is not limited thereto but that modifications within the scope of my invention may be made.

I claim:

1. A radio frequency transmission line comprising a pair of electrically conducting tubular members arranged parallel to one another, a slit along the adjacent sides of each member, the edges of each slit being joined to a corresponding edge of the slit in the other member by conducting strips, the capacity between said conducting strips being so related to the length of the interior circumferential conducting path of each of said tubular members that said paths are resonant to the operating frequency of said transmission line.

2. A radio frequency transmission line comprising a pair of electrically conducting tubular members arranged parallel to one another, a slit along the adjacent sides of each member, the edges of each slit being joined to the corresponding edge of the slit in the other member, the capacity between the edges of said slits being so related to the length of the interior circumferential conducting paths of each of said tubular members that said paths are resonant to the operating frequency of said transmission line.

3. A radio frequency transmission line comprising a plurality of electrically conducting tubular members arranged parallel to one another, a slit along the adjacent sides of each member, the edges of each slit being joined to an edge of the slit in another member, the capacity between the edges of said slits being so related to the length of the interior circumferential conducting paths of each of said tubular members that said paths are resonant to the operating frequency of said transmission line.

4. A radio frequency transmission line comprising a pair of electrically conducting tubular members arranged parallel to one another, a slit along the adjacent sides of each member, the edges of each slit being joined to a corresponding edge of the slit in the other member by conducting strips, the capacity between said conducting strips being so related to the length of the interior circumferential conducting path of each of said tubular member that each of said paths is resonant to a different frequency, said resonant frequencies being so related that a band-pass effect is obtained.

5. A radio frequency transmission line comprising a pair of electrically conducting tubular members arranged parallel to one another, a slit along the adjacent sides of each member, the edges of each slit being joined to the corresponding edge of the slit in the other member, the capacity between the edges of said slits being so related to the length of the interior circumferential conducting paths of each of said tubular members that each of said paths is resonant to a different frequency, said resonant frequencies being so related that a band-pass effect is obtained.

6. A radio frequency transmission line comprising a plurality of electrically conducting tubular members arranged parallel to one another, a slit along the adjacent sides of each member, the edges of each slit being joined to an edge of the slit in another member, the capacity between the edges of said slits being so related to the length of the interior circumferential conducting paths of each of said tubular members that each of said paths is resonant to a different frequency whereby a plurality of frequencies may be transmitted.

GEORGE LINDLEY USSELMAN.